US005844756A

United States Patent [19]

Saito

[11] Patent Number: 5,844,756

[45] Date of Patent: Dec. 1, 1998

[54] MAGNETORESISTIVE HEAD HAVING MANGANESE DIFFUSION LAYER

[75] Inventor: Masamichi Saito, Nagaoka, Japan

[73] Assignee: Alps Electric Co., Ltd., Japan

[21] Appl. No.: 856,369

[22] Filed: May 14, 1997

Related U.S. Application Data

[63] Continuation of Ser. No. 456,994, May 31, 1995, abandoned.

[30] Foreign Application Priority Data

Jun. 7, 1994 [JP] Japan .................................... 6-148590

[51] Int. Cl.[6] ........................................ G11B 5/39

[52] U.S. Cl. ........................................ 360/113

[58] Field of Search .......................... 360/113; 338/32 R; 324/252; 29/603.08

[56] References Cited

U.S. PATENT DOCUMENTS 4,103,315 7/1978 Hempstead et al. .................... 360/113
4,809,109 2/1989 Howard et al. .......................... 360/113
5,018,037 5/1991 Krounbi et al. ......................... 360/113
5,461,526 10/1995 Hamakawa et al. .................... 360/113

*Primary Examiner*—John H. Wolff
*Attorney, Agent, or Firm*—Brinks Hofer Gilson & Lione

[57] ABSTRACT

An MR head includes a soft magnetic (SAL) layer, a non-magnetic (SHUNT) layer, and a magnetoresistive (MR) layer, which are stacked on top of each other, with an antiferromagnetic layer being formed on the surface of the magnetoresistive layer except for the surface portion thereof corresponding to a track width (Tw) section. The Mn of the antiferromagnetic layer is diffused into region B of the magnetoresistive layer by heating, thereby enhancing the coercive force of region B. Due to this coercive force, the degree of single-magnetic-domain formation in the x-direction in the magnetoresistive layer increases. Thus, the MR head proves effective in reducing Barkhausen noise. Further, the layered structure can be manufactured at low cost by the same method as that for conventional exchange-bias-type MR heads.

5 Claims, 3 Drawing Sheets

| Layer | Thickness | Ref. |
| --- | --- | --- |
| Ta | 300 Å | 17 |
| $Fe_{51}$ $Mn_{49}$ | 300 Å | 5 |
| $Ni_{60}$ $Fe_{20}$ | 300 Å | 4 |
| Ta | 300 Å | 16 |
| GLASS SUBSTRATE 7mm SQUARE | | 15 |

MAGNETORESISTIVE HEAD HAVING MANGANESE DIFFUSION LAYER

This application is a continuation of application Ser. No. 08/456,994, filed May 31, 1995, now abandoned.

BACKGROUND OF THE INVENTION

The present invention relates to an MR (magnetoresistive) head to be provided, for example, in a flying-type magnetic head for hard disc apparatuses to exert a reproducing function, and, in particular, to an MR head which diminishes Barkhausen noise and which can be manufactured easily.

DESCRIPTION OF THE RELATED ART

FIG. 4 is a sectional view, seen from the recording-medium side, of an exchange-bias-type MR (magnetoresistive) head.

In this MR head, a SAL (soft magnetic) layer 2, a SHUNT (non-magnetic) layer 3, and an MR (magnetoresistive) layer 4 are sequentially stacked on top of each other in this order on a lower insulating layer 1 made of $Al_2O_3$ or the like. An antiferromagnetic layer 5 is formed on the surface of the magnetoresistive layer 4 except for the surface portion corresponding to a Tw (track width) region, and a lead layer 6 is formed on the antiferromagnetic layer 5. Further, an upper insulating layer 7 made of $Al_2O_3$ or the like is formed thereon.

In the exchange bias system, the magnetoresistive layer is magnetized in the x-direction (the longitudinal direction) to become a single magnetic domain due to the effect of the exchange anisotropy of the interface between the magnetoresistive layer 4 and the antiferromagnetic layer 5, which are stacked on top of each other in the exchange bond region (region B). This induces the magnetoresistive function region (region A), which is within the range of the Tw-region, to be magnetized in the x-direction to become a single magnetic domain. Further, an electric-current magnetic field generated when a sense current flows through the magnetoresistive layer 4 is applied in the y-direction to the soft magnetic layer 2, and a lateral bias magnetic field is imparted in the y-direction to region A of the magnetoresistive layer 4 due to the magnetostatic bond energy given by the soft magnetic layer 2. When this lateral magnetic field is imparted to region A of the magnetoresistive layer 4, turned into a single magnetic domain in the x-direction, the variation in resistance of region A of the magnetoresistive layer 4 in response to changes in the magnetic field (magnetoresistive effect characteristic: H-R effect characteristic) is set in a state where it exhibits a linearity.

When performing reproducing operation, the recording medium faces the head in a direction perpendicular to the plane of FIG. 4, with the relative movement between the magnetic head and the recording medium being effected in the z-direction. The above-mentioned sense current is supplied to region A through the lead layer 6 and the antiferromagnetic layer 5, and, due to the magnetoresistive effect (H-R effect), the resistance value of region A of the magnetoresistive layer 4 varies, which is detected as fluctuations in voltage.

FIG. 5 is a sectional view, as seen from the recording-medium side, of a hard-bias-type MR head.

In the hard bias system, a SAL (soft magnetic) layer 2, a SHUNT (non-magnetic) layer 3, and an MR (magnetoresistive) layer 4 are stacked on top of each other in this order on a lower insulating layer 1 that is made of $Al_2O_3$ or the like. The magnetoresistive layer 4 has a dimension corresponding to the Tw (track width).

Formed on either side section (as seen in the drawing) of the lower insulating layer 1 are a hard bias layer 8 that made of a Co-Cr-Ta-type material and a lead layer 9 on top of the hard bias layer 9. The hard bias layer 8 is electrically connected to both sides, with respect to the track-width dimension, of the magnetoresistive layer 4, and an upper insulating layer 7 that is made of $Al_2O_3$ or the like is formed on top of the above layers.

In this MR head, the hard bias layer 8 functions as a magnet which is magnetized in the x-direction (the longitudinal direction), and the magnetoresistive layer 4 is magnetized in the x-direction to become a single magnetic domain due to a longitudinal bias magnetic field imparted to the magnetoresistive layer 4 by the hard bias layer 8. In the hard bias system, a lateral bias magnetic field is imparted, as in the exchange bias system described above, in the y-direction to the magnetoresistive layer 4 by a magnetostatic bond energy given by the soft magnetic layer 2 when a sense current flows through the magnetoresistive layer 4, whereby the variation in resistance of the magnetoresistive layer 4 in response to changes in the magnetic field is set in a state in which it exhibits a linearity.

Both the exchange bias system and the hard bias system have their problems.

The MR head in the exchange bias direction shown in FIG. 4 is advantageous in that the process for stacking the component layers on top of each other can be conducted relatively easily. However, there is a limitation in the degree to which the exchange bond region (region B) of the magnetoresistive layer 4 is turned into a single magnetic domain, and the coercive force of this region cannot be enhanced beyond a certain range. Thus, due to the multi-magnetic-domain effect of the magnetoresistive layer 4 in the magnetoresistive function region (region A), the Barkhausen noise is liable to increase.

In the hard-bias-type MR head shown in FIG. 5, a longitudinal bias magnetic field is imparted to the magnetoresistive layer 4 by the hard bias layer 8 functioning as a magnet, so that the degree to which the magnetoresistive layer 4 is turned into a single magnetic domain in the x-direction can be enhanced as compared to that in the exchange bias system.

However, as shown in FIG. 5, after stacking the soft magnetic layer 2, the non-magnetic layer 3, and the magnetoresistive layer 4 on top of each other on the lower insulating layer 1, the side portions of these three stacked layers are etched by ion milling or the like, and then the hard bias layer 8 and the lead layer are stacked, so that the film formation process consists of a large number of steps. Further, it is necessary to perform etching on the three layers: the soft magnetic layer 2, the non-magnetic layer 3, and the magnetoresistive layer 4 in such a way that they exhibit a predetermined angle $\theta$ to thereby secure the requisite connectivity between the hard bias layer 8 and the magnetoresistive layer 4. It should be noted in this regard that it is difficult to control the etching so as to obtain the angle $\theta$, so that an advanced film-formation technique is required. Thus, there is a limit to the mass production of heads of this type.

Further, as shown in FIG. 5, in the hard bias system, the hard bias layer 8 is liable to put the soft magnetic layer under the influence of the magnetic field. Due to the influence of the magnetic field, the direction of the lateral bias magnetic field imparted to the magnetoresistive layer 4 from the soft magnetic layer 2 is changed, so that the direction of the bias magnetic field imparted to the magnetoresistive layer 4 is inclined toward the x-axis in the x-y coordinate plane. As a result, there is a deterioration in the linearity of the variation in resistance in the magnetoresistive layer 4 in response to changes in the magnetic field.

SUMMARY OF THE INVENTION

The present invention has been made with a view toward solving the above problems. It is an object of the present invention to provide an MR head which has an easily manufacturable layer structure similar to that of an exchange-bias type MR head and in which the single-magnetic-domain formation of the magnetoresistive function region of the magnetoresistive layer is effected to a higher degree to thereby achieve a reduction in Barkhausen noise.

According to the present invention, an MR head is based on the same layered (film) structure as that of an exchange-bias type MR head, and a component of the antiferromagnetic layer, for example, a metal component (e.g., Mn (manganese) which is a metal component having a high magnetic susceptibility), is diffused into that region (the exchange bond region) of the magnetoresistive layer on which the antiferromagnetic layer is formed, whereby the coercive force of the exchange bond region of the magnetoresistive layer can be increased, and the degree of single-magnetic-domain formation in the magnetoresistive layer due to exchange anisotropy can be enhanced, thereby making it possible to construct an MR head in which the problem of Barkhausen noise, etc. are mitigated.

In accordance with the present invention, there is provided an MR head in which a soft magnetic layer, a non-magnetic layer, and a magnetoresistive layer are stacked on top of each other and in which an antiferromagnetic layer is formed on the surface of the magnetoresistive layer except for the surface portion thereof corresponding to a track width region, wherein a component of the antiferromagnetic layer (metal component), for example, a metal component having a high magnetic susceptibility, is diffused into the magnetoresistive layer, whereby the coercive force of that region of the magnetoresistive layer on which the antiferromagnetic layer is formed is at a higher level than the magnetoresistive force of that region of the magnetoresistive layer which is within the range of the track width section.

With respect to a case in which the antiferromagnetic layer is made of an Fe-Mn (iron-manganese)-type material and in which the magnetoresistive layer consists of an Ni-Fe (nickel-iron)-type material, a measurement was performed to examine the relationship between the depth of the Mn diffusion layer in the magnetoresistive layer and the coercive force of the magnetoresistive layer. The results of the measurement naturally showed that the coercive force increases as the depth of the Mn diffusion layer increases. As to the degree of increase in the magnetic field imparted to the magnetoresistive layer due to the diffusion of Mn, it should be noted that the degree of single-magnetic-domain formation in the track width region (the magnetoresistive function region) increases when the coercive force of the magnetoresistive layer, which increases with the diffusion of Mn, attains a level not lower than a magnetic field which is imparted to the magnetoresistive layer by the effect of the exchange anisotropy of the interface between the antiferromagnetic layer and the magnetoresistive layer. Thus, the structure is effective in reducing Barkhausen noise.

For the coercive force of the magnetoresistive layer, in which Mn is diffused, to attain a level not lower than the magnetic field imparted to the magnetoresistive layer by the effect of exchange anisotropy, it is desirable that the depth of the Mn diffusion layer in the magnetoresistive layer be 50 Å or more. When the depth of the diffusion layer is 100 Å or more, or 120 Å or more, the coercive force of the exchange bond region of the magnetoresistive layer becomes much larger than the magnetic field imparted to the magnetoresistive layer by the effect of exchange anisotropy. Therefore, a more preferable range of the depth of the Mn diffusion layer in the magnetoresistive layer is 100 Å or more, or 120 Å or more.

In accordance with the present invention, there is further provided an MR head manufacturing method comprising the steps of: forming a soft magnetic layer, a non-magnetic layer, and a magnetoresistive layer so as to stack them on top of each other; forming an antiferromagnetic layer on the surface of the magnetoresistive layer except for the surface region thereof which corresponds to a track width section; heating the resultant layered structure to diffuse a component (metal component) of the antiferromagnetic layer into the magnetoresistive layer to thereby make that region of the coercive force of the magnetoresistive layer on which the antiferromagnetic layer is formed higher than the coercive force of that region of the magnetoresistive layer which is within the range of the track width section.

In an MR head manufacturing process, after the component layers have been formed by sputtering, annealing is conducted at, for example, approximately 250° C. and for approximately two hours to thereby remove any distortion in the layers. In the present invention, this heating process is performed for a period of time sufficiently longer than the heating time for the annealing process. That is, in the present invention, this heating process is performed for the purpose of diffusing a component (metal component) of the antiferromagnetic layer into the magnetoresistive layer to thereby make the coercive force of that section of the magnetoresistive layer in which the component is diffused sufficiently large. This heating process may also serve as the heating for the above-mentioned annealing for distortion removal, or it may be conducted separately from the annealing process.

The heating time is set such that the coercive force of that section of the magnetoresistive layer which constitutes the exchange bond region is at the same level as or higher than the magnetic field due to the effect of exchange anisotropy. When the antiferromagnetic layer is made of an Fe-Mn type material, and the magnetoresistive layer is made of an Ni-Fe type material, it is desirable that the heating be effected at a temperature not lower than 250° C. for not less than 10 hours. The depth of the Mn diffusion layer in the magnetoresistive layer in this case is approximately 50 Å or more. When the temperature is not lower than 250° C. and the heating time is not less than 30 hours, the depth of the diffusion layer is not less than 100 Å. When the heating time is not less than 40 hours, the depth of the diffusion layer is 120 Å or more. Thus, a more preferable range of the time of heating, at a temperature not lower than 250° C., is not less than 30 hours, or not less than 40 hours.

With the above means, a component of the antiferromagnetic layer, and, in particular, a metal component (one having a high magnetic susceptibility, for example, Mn (manganese)), is diffused into the region of the magnetoresistive layer on which the antiferromagnetic layer is formed (i.e., the exchange bond region), to a depth of preferably not less than 50 Å. As a result, the coercive force of that section of the magnetoresistive layer which constitutes the exchange bond region increases to attain a level which is the same as or higher than the strength of the magnetic field imparted to the magnetoresistive layer by the effect of exchange anisotropy. Accordingly, the magnetoresistive layer can be more easily magnetized by the effect of exchange anisotropy and more more easily undergo single-magnetic-domain formation. Thus, the degree of single-magnetic-domain formation in that section of the magnetoresistive layer which is within the range of the track width region increases, whereby a reduction in Barkhausen noise is achieved.

In the above-described MR head manufacturing method, a component of the antiferromagnetic layer is diffused into the magnetoresistive layer by a heating process. The basic layer construction is the same as that of an exchange-bias-type MR head, which means, in the above method, the only additional requirement, as compared to the method for producing an exchange-bias-type head is, to heat the layer structure under predetermined conditions (e.g., at 250° for 10 hours or more). Therefore, the film formation process is easier than in the case of a hard-bias-type MR head, whereby mass production of the head is possible at a low cost.

DESCRIPTION OF THE PREFERRED EMBODIMENT

An embodiment of the present invention will now be described with reference to the drawings.

Figures 1, 2:
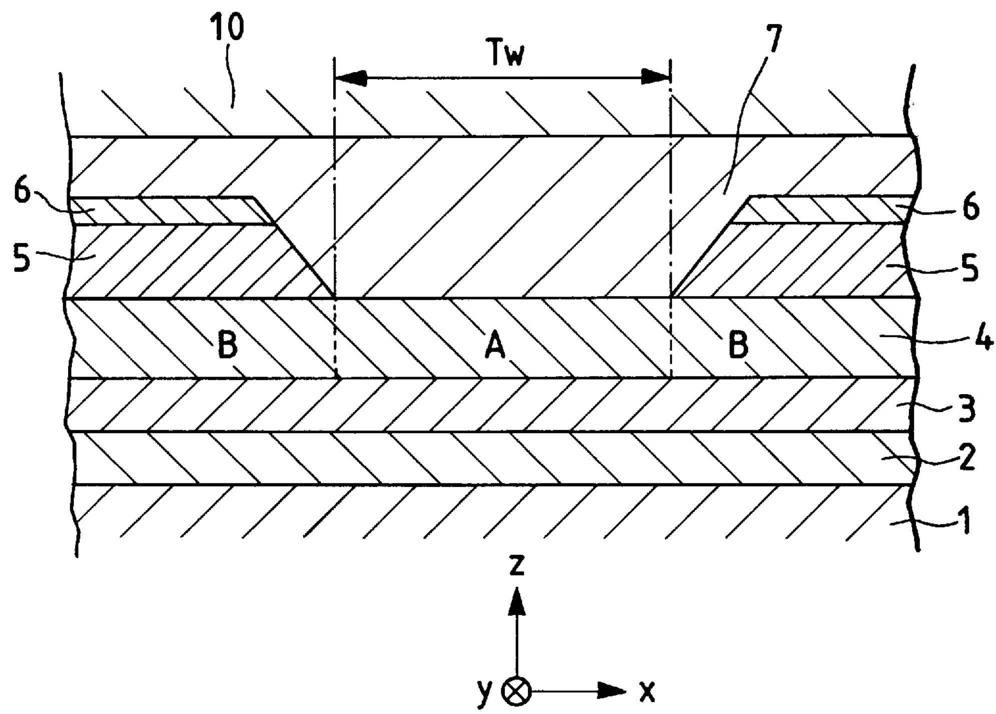
FIG. 1 is a sectional view showing an MR head according to an embodiment of the present invention.
FIG. 2 is a diagram illustrating the layered structure of an experimental specimen.

FIG. 1 is a sectional view, seen from the side of the recording medium, for example, a hard disk, of an MR head according to an embodiment of the present invention.

This MR head is to be provided, for example, on the trailing-side end surface of a flying-type magnetic head for use in a hard disk apparatus. This magnetic head functions as a reproducing head. In the case of a complex head for both recording and reproduction, a recording magnetic head section in the form of a thin film is formed on an upper shielding layer 10 of the MR head shown in FIG. 1.

The recording surface of a recording medium, such as a hard disk, faces the magnetic head in a direction parallel to the plane of FIG. 1. The x-direction is the direction of the track width, and the z-direction is a direction in which the magnetic head and the recording medium move relative to each other.

In this MR head, a lower insulating layer 1 consisting of an $Al_2O_3$ film is formed on a lower shielding layer made of Permalloy or the like. On the lower insulating layer 1, a SAL (soft magnetic) layer 2, a SHUNT (non-magnetic) layer 3, and an MR (magnetoresistive ) layer 4 are formed so as to be stacked sequentially in this order. For example, the magnetoresistive layer 4 consists of an Ni-Fe-type material layer having a thickness of 300 Å, the non-magnetic layer 3 consists of a Ta layer having a thickness of 200 Å, and a soft magnetic layer 2 consists of an Fe-Ni-Nb (iron-nickel-niobium)-type material having a thickness of 250 Å.

On the surface of the magnetoresistive layer 4, an antiferromagnetic layer 5 is formed on either side with respect to the x-direction of the Tw (track width) section. The antiferromagnetic layer 5 consists, for example, of an Fe-Mn-type material layer having a thickness of 300 Å. A lead layer 6 is formed on the antiferromagnetic layer 5. This lead layer 6 consists of a Cr (chromium) layer.

Formed on top of these layers is an upper insulating layer 7 made of $Al_2O_3$, and an upper shielding layer 10 consisting of Permalloy or the like is formed thereon.

After the above-mentioned layers have been sequentially formed by sputtering, heating is performed under the heating conditions stated below. As a result, Mn (manganese), which is a metal component of the antiferromagnetic layer 5 having a high magnetic susceptibility, is diffused into that region of the magnetoresistive layer 4 on which the antiferromagnetic layer 5 is formed (i.e., the exchange bond region referred to as region B), with the result that the coercive force of that region B of the magnetoresistive layer 4 is larger than the coercive force of that section thereof which corresponds to the Tw (track width) region (i.e., the magnetoresistive function region referred to as region A).

Figure 4:
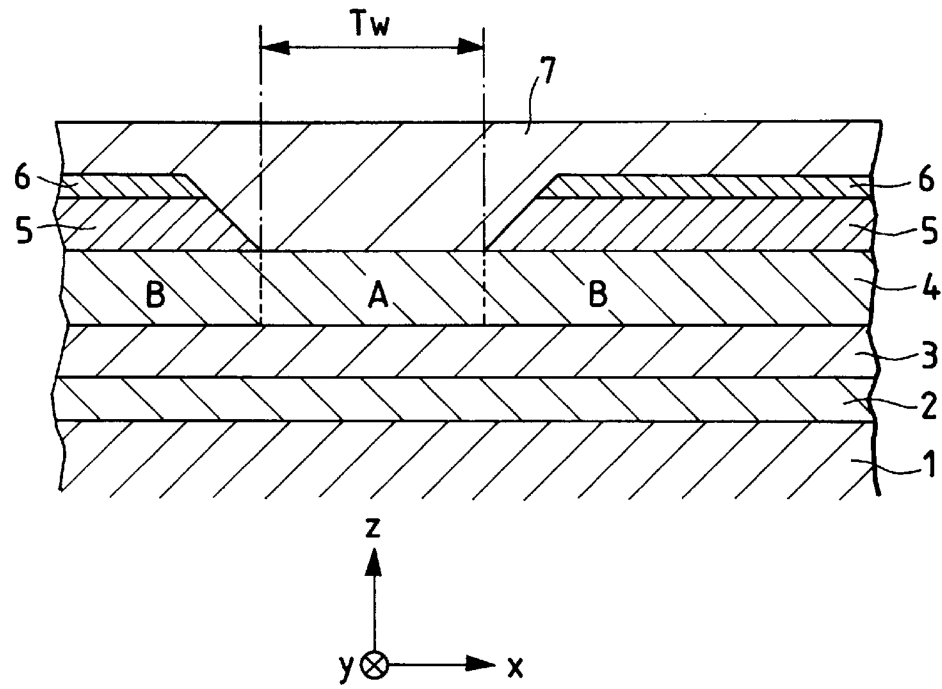
FIG. 4 is a sectional view showing a conventional exchange-bias-type MR head.
Figure 5:
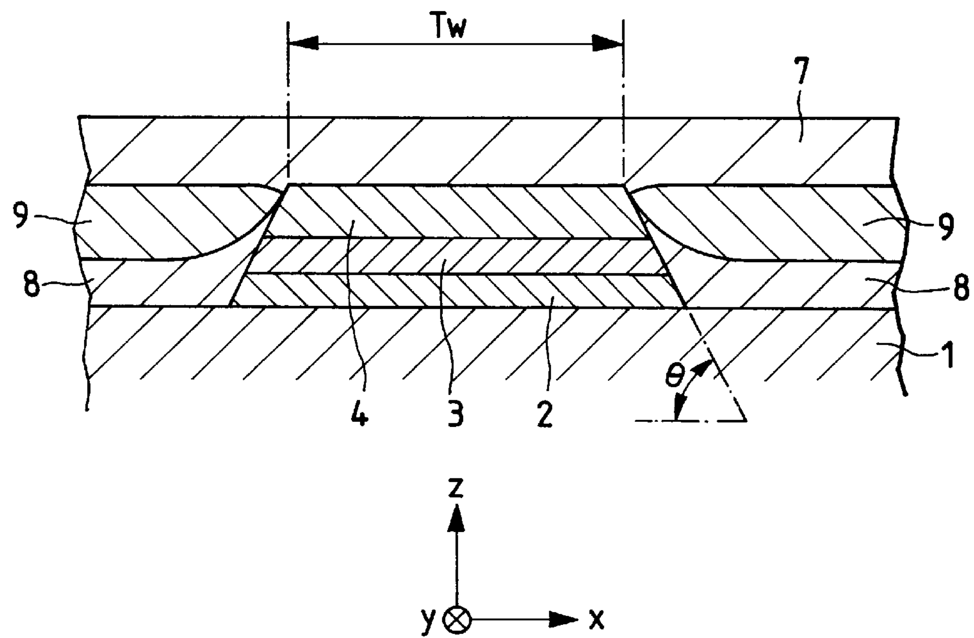
FIG. 5 is a sectional view showing a conventional hard-bias-type MR head.

In this MR head, region B of the magnetoresistive layer 4 is magnetized in the x-direction to be turned into a single magnetic domain by the effect of the exchange anisotropy of the interface between region B of the magnetoresistive layer 4 and the antiferromagnetic layer 5. Due to the diffusion of Mn, the coercive force of the exchange bond region B of the magnetoresistive layer 4 is increased, so that the degree of single-magnetic-domain formation in region B is higher than that in the conventional exchange bias type MR head shown in FIG. 4. This induces the degree of single-magnetic-domain formation in the x-direction in the magnetoresistive function region (region A) of the magnetoresistive layer 4 to become higher, with the result that the accuracy in magnetization in the x-direction increases. Further, an electric-current magnetic field generated when a sense current flows through the magnetoresistive layer 4 is applied in the y-direction to the soft magnetic layer 2, and, due to a magnetostatic bond energy given by the soft magnetic layer 2, a lateral bias magnetic field is imparted in the y-direction to region A of the magnetoresistive layer 4. Due to the single-magnetic-domain formation in the x-direction and the bias magnetic field in the y-direction in region A of the magnetoresistive layer 4, the linearity of the magnetoresistive effect characteristic (the H-R effect characteristic) of the magnetoresistive layer 4 is ensured. The degree of single-magnetic-domain formation in the x-direction in region A of the magnetoresistive layer 4 is high, so that the linearity of the magnetoresistive characteristic is very high.

The recording medium, such as a hard disk, and the MR head move relative to each other in the z-direction. In reproducing operation, a sense current is supplied to region A of the magnetoresistive layer 4 from the lead layer 6 through the antiferromagnetic layer 5. The magnetic field of the recording medium causes the resistance of the magnetoresistive layer 4 to change, and a sense voltage based on this change in resistance is obtained. As stated above, the degree of single-magnetic-domain formation of the magnetoresistive layer. 4 is high, and the linearity of the magnetoresistive characteristic can be ensured. Thus, as compared to the exchange-bias-type MR head, a reduction in Barkhausen noise is achieved.

With respect to the above-described MR head, the following experiment was conducted in order to check the condition of diffusion of the metal component from the antiferromagnetic layer 5 to the magnetoresistive layer 4, and a preferable range for the heating conditions in the MR head manufacturing method.

FIG. 2 shows an experimental specimen. This specimen was prepared as follows: A Ta (tantalum) layer having a thickness of 300 Å was formed by sputtering on a 7 mm-square glass substrate 15 as a barrier layer 16. Then, an $Ni_{80}Fe_{20}$ (at %) layer having a thickness of 300 Å was formed thereon as the magnetoresistive layer 4, and then an $Fe_{51}Mn_{49}$ (at %) layer having a thickness of 300 Å was formed thereon as the antiferromagnetic layer 5. Further, a Ta (tantalum) layer having a thickness of 300 Å was formed thereon as a barrier layer 17. The formation of these layers is effected by sputtering. The lower Ta layer 16 is provided for the purpose of preventing the Si, etc. in the glass substrate 15 from being diffused into the magnetoresistive layer 4, and the upper barrier layer 17 is provided for the purpose of preventing the antiferromagnetic layer 5 from being oxidized by the heating.

A plurality of specimens as described above were prepared, and subjected to heating at 250° C. for 10 hours, 20 hours, 30 hours, 40 hours, and 50 hours, respectively. Each of the specimens thus heated and the specimen not heated was examined for the coercive force of the magnetoresistive layer 4 and the exchange-anisotropy magnetic field imparted to the magnetoresistive layer 4 due to the exchange anisotropy effect of the interface between the magnetoresistive layer 4 and the antiferromagnetic layer 5.

Figure 3:
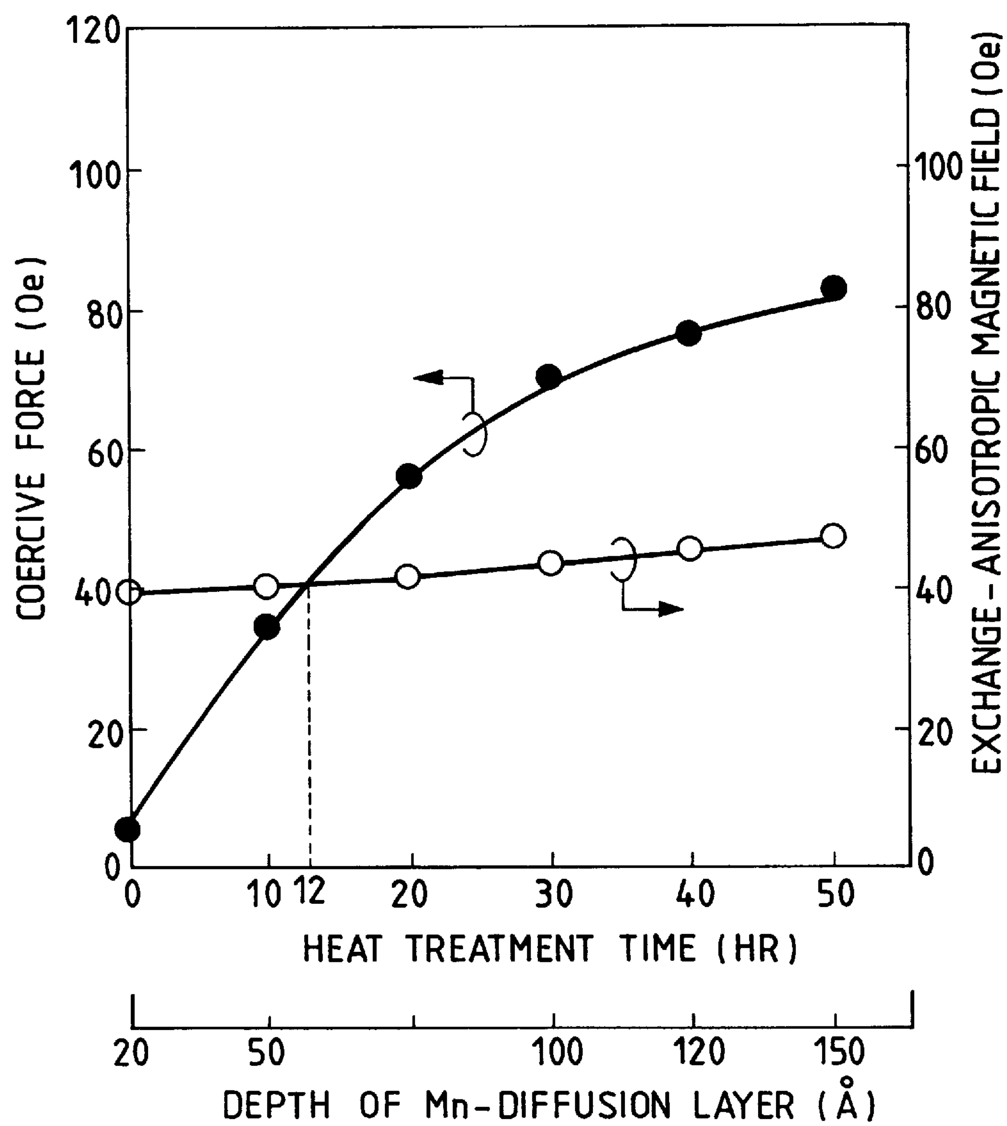
FIG. 3 is a chart showing the relationship between heating time and coercive force.

FIG. 3 shows the results of the examination. The horizontal axis indicates time of heating (in the unit of hours) at 250° C., the left-hand vertical axis indicates the coercive force (Oe) of the magnetoresistive layer 4, and the right-hand vertical axis indicates the magnetic field (Oe) due to the exchange anisotropy of the interface between the magnetoresistive layer 4 and the antiferromagnetic layer 5. In the chart, the filled-in circles indicate coercive force and the open circles indicate measured values of exchange-anisotropic magnetic fields.

It can be recognized from FIG. 3 that, when a specimens is heated at 250° C., an increase in the length of heating time causes practically no change in the exchange-anisotropic magnetic field. It can also be recognized that the coercive force of the magnetoresistive layer 4 increases as the length of the heating time increases.

Etching was performed on the surface of the magnetoresistive layer 4 (the surface thereof which is joined to the antiferromagnetic layer 5) of each of the specimens shown in Table 2: the one which had not been subjected to heat treatment, and the ones heat-treated at 250° C. for 30 hours, 40 hours, and 50 hours, respectively. The specimens were examined for depth file by Auger electron spectroscopy. Measurement was performed on the depth, as measured from the above-mentioned surface, of the diffusion layer, in which Mn, which is a metal component of the antiferromagnetic layer 5, is diffused in the magnetoresistive layer 4.

Table 1 shows the heat treating times of the specimens and the depths of their respective Mn diffusion layers.

TABLE 1

| Heat-treatment time (HR) | 0 | 10 | 30 | 40 | 50 |
|---|---|---|---|---|---|
| Depth of Mn diffusion layer (Å) | 20 | 50 | 100 | 120 | 150 |

In the horizontal axis of FIG. 3, the respective depths (Å) of the Mn diffusion layers corresponding to the different heat-treatment times are given in parentheses.

It can be easily seen from FIG. 3 and Table 1 that the increase in the coercive force of the magnetoresistive layer 4 through heat treatment is attributable to the diffusion of Mn, which is a metal component of the antiferromagnetic layer 5, into the magnetoresistive layer 4. Further, it can also be seen that the coercive force increases as the heat treatment time increases and as the Mn diffusion layer spreads.

Thus, in the MR head shown in FIG. 1, when region B, and further, region A, of the magnetoresistive layer 4 are turned into a single magnetic domain by the effect of the exchange anisotropy in the interface between the magnetoresistive layer 4 and the antiferromagnetic layer 5, if the coercive force in region B attains a level not lower than the exchange-anisotropic magnetic field imparted to the magnetoresistive layer due to the effect of the exchange anisotropy, the degree of single-magnetic-domain formation in region A increases. Thus, this MR head proves effective in reducing Barkhausen noise.

Thus, when the antiferromagnetic layer 5 is made of an Fe-Mn-type material, and the magnetoresistive layer 4 is made of an Ni-Fe-type material, a preferable range for the period of time of heat treatment at 250° C. is 10 hours or more, or 12 hours or more, in which range the exchange-anisotropic magnetic field and the coercive force are substantially at the same level. A preferable range for the depth of the Mn diffusion layer in the magnetoresistive layer 4 at this time is 50 Å or more.

As shown in FIG. 3, when the heat-treatment time is 30 hours or 40 hours, the coercive force in region B of the magnetoresistive layer 4 becomes still higher. Therefore, a more preferable range for the heat-treatment time at 250° C. is 30 hours or more, or even 40 hours or more. A more preferable range for the depth of the Mn diffusion layer in the magnetoresistive layer 4 is 100 Å or more, or even 120 Å or more.

In the MR head of FIG. 1, when the heat-treatment time is 40 hours or more, or 50 hours or more, the depth of the Mn diffusion layer in the magnetoresistive layer 4 becomes 120 Å or more, or 150 Å or more, so that the coercive force of the region B of the magnetoresistive layer 4 attains a high level of 70 (Oe). Thus, if, in this case, an external magnetic field is imparted to region B of the magnetoresistive layer 4, and exclusively region B of the magnetoresistive layer 4 is permanently magnetized in the x-direction, it is possible to turn the magnetoresistive function region A of the magnetoresistive layer 4 into a single magnetic domain in the x-direction with a still higher accuracy by this permanent magnetic field, or by both this permanent magnetic field and the effect of the exchange anisotropy of the interface between the magnetoresistive layer 4 and the antiferromagnetic layer 5. In this way, in the MR head shown in FIG. 1, it is possible for region B of the magnetoresistive layer 4 to function as a hard bias layer.

The MR head of the present invention is not restricted to a flying-type magnetic head, but it is also applicable to other types of magnetic head and magnetic detecting devices.

As described above, in the MR head of the present invention, it is possible to increase the degree of single-magnetic-domain formation in the magnetoresistive function region of the magnetoresistive layer, thereby making it possible to reduce Barkhausen noise.

Further, in the MR head manufacturing method of the present invention, the layered structure is the same as that of the conventional exchange bias type MR head. Thus, the heat treatment is the only additional requirement as compared to the method of manufacturing the conventional exchange bias type MR head, which means the film formation process of the present invention is relatively easy, thereby achieving a reduction in cost and making the head suitable for mass production.

What is claimed is:

1. A magnetoresistive head comprising:

a soft magnetic layer, a non-magnetic layer formed on the soft magnetic layer, a magnetoresistive layer formed on the non-magnetic layer, an antiferromagnetic layer formed on first and second portions of the magnetoresistive layer, the first and second portions being separated by a magnetoresistive function region of the magnetoresistive layer having a length equal to a track width of the magnetoresistive head, wherein said antiferromagnetic layer is formed of a material containing Mn, wherein an Mn diffusion layer is formed at an interface between the first and second portions of the magnetoresistive layer and the antiferromagnetic layer, said Mn diffusion layer consisting of Mn diffused from said antiferromagnetic layer into said magnetoresistive layer, wherein a coercive force into said Mn diffusion layer is larger than a coercive force into the magnetoresistive layer adjacent said Mn diffusion layer at said first and second portions, and said coercive force into said Mn diffusion layer is larger than a coercive force into the magnetoresistive layer at the magnetoresistive function region, wherein said magnetoresistive function region is magnetized in the longitudinal direction by an exchange anisotropic magnetic field operating at the interface between the first and second portions of the magnetoresistive layer and the antiferromagnetic layer, and a permanent magnetic field generated due to a coercive force increased by formation of said Mn diffusion layer at said first and second portions, and wherein said coercive force increased by formation of said Mn diffusion layer at said first and second portions is larger than said exchange anisotropic magnetic field.

2. The magnetoresistive head according to claim 1, wherein said Mn diffusion layer has a thickness in the range of 50 angstroms to 120 angstroms.

3. The magnetoresistive head according to claim 2, wherein said magnetoresistive layer is formed of NiFe, and said antiferromagnetic layer is formed of FeMn.

4. A magnetoresistive head manufacturing method comprising the steps of:

laminating a soft magnetic layer and a magnetoresistive layer with a non-magnetic layer being disposed therebetween;

laminating an antiferromagnetic layer containing Mn on first and second portions of a surface of said magnetoresistive layer, said first and second portions being separated by a distance corresponding to the width of a reproduction track;

forming an Mn diffusion layer at an interface between the first and second portions of said magnetoresistive layer and the antiferromagnetic layer by applying heat treatment such that Mn in said antiferromagnetic layer diffuses into said magnetoresistive layer at said first and second portions to increase a coercive force and to generate an exchange anisotropic magnetic field at the interface between the first and second portions of said magnetoresistive layer and the antiferromagnetic layer, wherein the coercive force increased by formation of said Mn diffusion layer at said first and second portions is larger than said exchange anisotropic magnetic field; and generating a permanent magnetic field by applying an external magnetic field to said magnetoresistive layer including said Mn diffusion layer at said first and second portions.

5. The magnetoresistive head manufacturing method according to claim 4, wherein said heat treatment is applied at a temperature of at least 250° C. for a period of 10 to 40 hours.

* * * * *